UNITED STATES PATENT OFFICE.

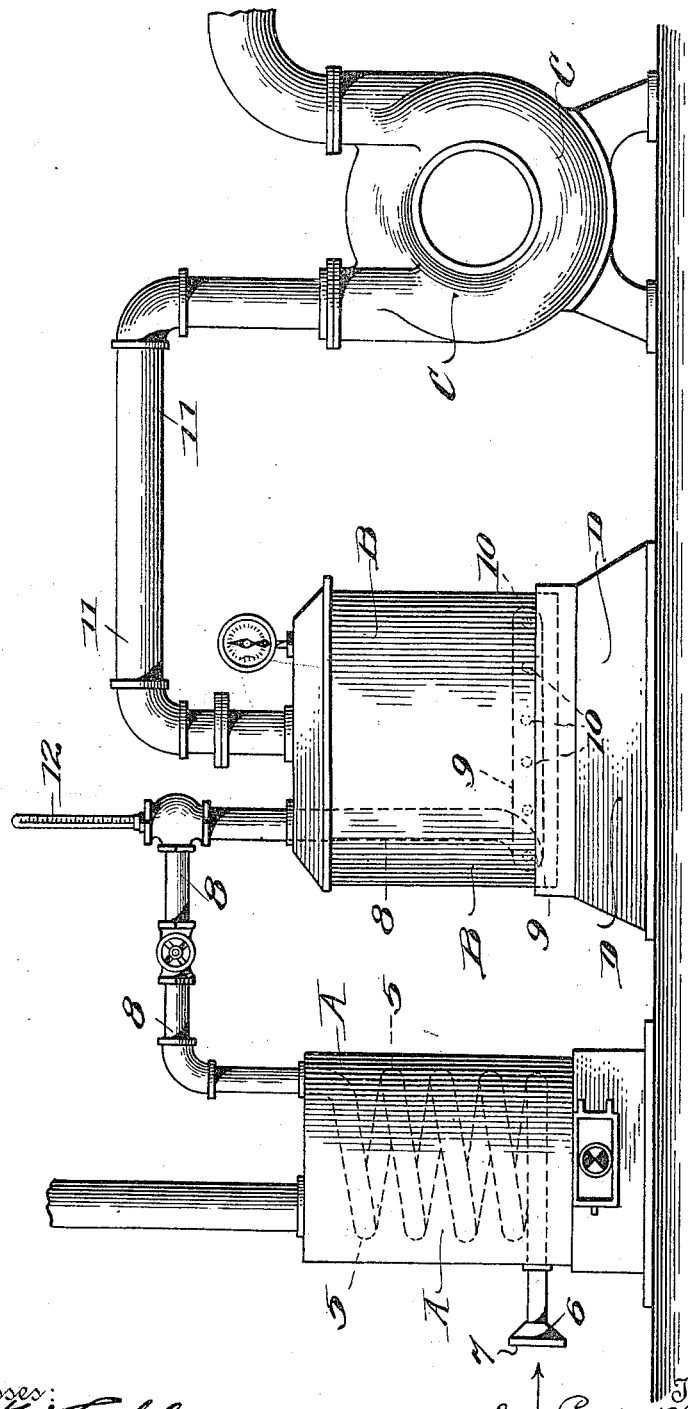

CASSIUS CLAY PALMER, OF CRANFORD, NEW JERSEY, ASSIGNOR TO MARTHA ELLA PALMER, OF CRANFORD TOWNSHIP, UNION COUNTY, NEW JERSEY.

PROCESS OF STERILIZING MILK.

963,244.  Specification of Letters Patent.  Patented July 5, 1910.

Application filed February 16, 1907. Serial No. 357,670.

*To all whom it may concern:*

Be it known that I, CASSIUS CLAY PALMER, a citizen of the United States, and a resident of Cranford, in the county of Union and State of New Jersey have invented certain new and useful Improvements in Processes of Sterilizing Milk, of which the following is a specification.

This invention relates to an improvement in the process of sterilizing milk, the object being to destroy the germs of decomposition or disease commonly present in unsterilized milk.

The invention consists in the improved process set forth in and falling within the scope of the appended claims.

In order to destroy the germs such as above recited, I have found that it is desirable to heat the milk to a temperature upward of 167° F., and furthermore, that it is desirable that the entire body of milk be subjected to heat at the same time; that is to say, no portion or particle of the milk should be left unheated, while it is further desirable that the milk should not reach the boiling point.

In carrying out my invention I pass a current of heated air to the body of milk and preferably force such air through the milk by pressure or suction, so that the body is agitated and the heated air well distributed therethrough, thus resulting in the complete and uniform heating of the entire bulk.

In the accompanying drawing I have shown one form of apparatus by means of which my invention may be carried into effect, but it will of course be understood that other forms of apparatus may be employed in the performance of the process.

In the accompanying drawings A indicates a heater, B a receptacle containing the body or bulk of milk, and C indicates a compressor. The heater A, which may be of any suitable construction of stove, furnace or the like, has therein an air pipe, preferably in the form of a coil indicated at 5, and provided with an open end portion 6, enlarged or flared and which, if desired, may be covered with a screen 7 of fabric or other suitable material for the purpose of preventing the entrance of dust and the like. This coil is connected with the receptacle B by means of suitable pipe connections 8, leading into the receptacle and terminating preferably in a coil 9 provided with air outlets or perforations 10. The receptacle B and the compressor C are also connected by the air pipe 11 and such compressor is preferably in the nature of a suction device exerting a drawing or suction effect upon the body of milk sufficient to draw the heated air which passes through the heating coil and the connection 8, to the coil 9, and thence through the openings 10 into the body of milk. This action of the compressor in drawing the heated air through the orifices or perforations 10 in the coil tends to draw such air upward through the body of milk and thus cause the agitation or bubbling of the milk. As the compressor is started the air from over the milk will be exhausted and a vacuum produced. At the same time the heater is in operation and the coils of the interior of such heater raised to the desired temperature necessary to sterilize the air as it passes through the pipes. The vacuum in the milk receptacle or tank draws the air through the pipes between the heater and the tank, thus causing the agitation before described and at the same time the heat of the air assists in raising the temperature of the milk to the desired degree to insure sterilization. It is obvious that by this process it will be impossible for any portion of the milk to escape contact with the temperature necessary to cause the sterilization.

If desired, the receptacle B may be placed in an auxiliary heating device such as a sand bath D, and the pipe connection between the heater and the receptacle provided with a thermometer 12.

In the present invention I do not limit myself to drawing air through the milk by suction, for any other arrangement may be employed for passing the air through the body of milk.

After sterilizing the milk should be cooled as rapidly as possible and any suitable means may be employed for this purpose.

Having thus described my invention, what I claim as new and desire to secure by Letters Patent is:

1. The process of sterilizing milk, which consists in passing fine streams or globules of air heated to a sterilizing temperature through a body of milk for a period of time sufficient to render the milk sterile.

2. The process of sterilizing milk, which consists in placing a body of milk in a closed container, forcing a body of air heated to approximately 150° F. through the body of milk, the air being broken up into fine streams or globules in passing through the milk so as to come in intimate contact with the milk particles, and creating a circulation of the air through the container.

In testimony whereof I have hereunto signed my name to this specification in the presence of two subscribing witnesses.

CASSIUS CLAY PALMER.

Witnesses:
R. B. CAVANAGH,
JOS. J. PIERANDO.